MAGNETIC MEMORY WITH APERTURED STRIP ELEMENTS

Filed Sept. 18, 1962 3 Sheets-Sheet 1

INVENTORS
JAMES C. SAGNIS, JR.
MICHAEL TEIG
ROBERT L. WARD

BY Thomas & Crickenberger
ATTORNEYS

United States Patent Office 3,559,186
Patented Jan. 26, 1971

3,559,186

MEMORY WITH APERTURED STRIP ELEMENTS

James C. Sagnis, Jr., Ossining, Michael Teig, Yonkers, and Robert L. Ward, Yorktown Heights, N.Y., assignors to International Business Machines Corporation, New York, N.Y., a corporation of New York Filed Sept. 18, 1962, Ser. No. 224,415
Int. Cl. G11c *11/14, 7/00*
U.S. Cl. 340—174 9 Claims

ABSTRACT OF THE DISCLOSURE

A conductive magnetic strip having one or more apertures therein. Drive apparatus is provided to establish flux states about the apertures and read apparatus is provided to alter the flux states about the apertures. Sense conductors coupled through the apertures furnish output signals.

This invention relates to magnetic memories, particularly those which employ relatively thin, metallic, data storage elements.

A feature of the invention is a novel method of reading out information stored in the form of a remanent magnetization extending peripherally around an aperture in an elongated strip memory element. This readout method involves applying to the memory element a variable magnetic field a substantial portion of which is angularly related to the periphery of the aperture for thereby disturbing the remanent magnetization around the aperture and inducing an output signal. Such a disturbing field can be produced by passing an electric current pulse longitudinally through the strip.

It is another feature of this invention to provide a nondestructive read out magnetic memory device which is simple in construction and fast in operation.

According to one novel arrangement of this invention a memory element is provided which consists of a thin strip of magnetizable metallic material having a width which is large compared to the thickness. A hole is disposed in the center of the strip, and binary information is represented by remanent states of magnetization in the clockwise or counterclockwise direction about the hole. Readout is accomplished by passing a read current through the thin metallic strip, and this current generates a magnetic field which interacts with the remanent magnetization about the hole to cause a transient change in magnetic flux. The transient change of magnetic flux may be detected by means of a sense winding linking the hole. The polarity of the signal induced in the sense winding depends upon the remanent state of magnetization about the hole, not upon the direction of the read current. Preferably (although not necessarily) the readout is nondestructive, so that the remanent magnetization returns substantially to its original state upon removal of the read current. It will be assumed in the following description that all readout operations are nondestructive.

The foregoing and other objects, features and advantages of the invention will be apparent from the following more particular description of preferred embodiments of the invention, as illustrated in the accompanying drawings in which.

Figure 1:
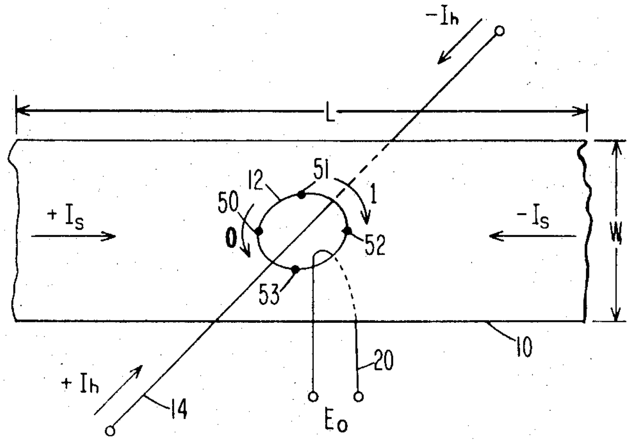
FIG. 1 illustrates one storage element according to this invention.

Referring first to FIG. 1, a thin metallic strip 10 is shown with an aperture or hole 12 therein. The thin metallic strip 10 is made from a metallic material which is magnetizable. It is important that the thin metallic strip 10 have a thickness which is small compared to the width W or length L. Stated alternatively, the width W and length L are large compared to the thickness.

A write line 14 passes through the hole or aperture 12 of the strip 10, and currents along this line are employed to establish remanent states of magnetization in the areas adjacent the aperture or hole 12. Current flowing to the right or upwardly along the line 14 is arbitrarily designated $+I_h$. This establishes a magnetic field in a clockwise direction around the hole 12, and a magnetic field in this direction is arbitrarily assumed to represent a binary one. Current to the left or downwardly along the line 14 is designated $-I_h$. Current in this direction along the line 14 establishes a magnetic field in the counterclockwise direction around the hole 12, and such a magnetic field is arbitrarily assumed to represent binary zero. After write current is applied and terminated on the line 14, a remanent state of magnetization is established in the areas of the thin strip 10 adjacent the aperture 12, in a clockwise or counterclockwise direction depending upon the direction of the write current.

A sense winding 20 is threaded through the hole 12 as shown, and a signal is induced in this winding when current pulses are established in the thin metallic strip 10 in either direction. A read (or interrogate) current $+I_s$ is designated as a current which flows from left to right in the thin metallic strip 10, and a read (or interrogate) current $-I_s$ is designated as a current flowing from the right to the left in the thin metallic strip 10.

Figure 2:
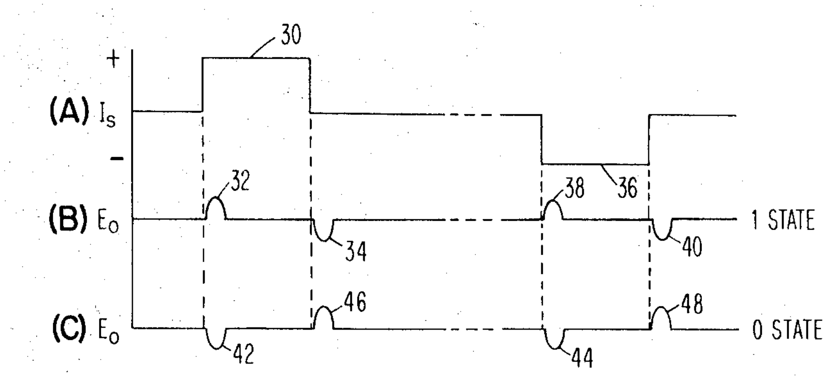
FIG. 2 shows a set of wave forms useful in explaining the operation of the memory element in FIG. 1.

Reference is made to FIG. 2 for a discussion of the operation of the storage device in FIG. 1. If a read current pulse $+I_s$ such as the pulse 30 in FIG. 2 is established in the thin metallic strip 10 in FIG. 1 when the remanent flux around the hole 12 is in a clockwise direction representing a binary one, a voltage wave 32 in FIG. 2B is induced in the sense winding 20 when the current pulse 30 is initiated, and a voltage wave 34 is induced in the sense winding 20 when the current pulse 30 is terminated. If the remanent flux around the hole 12 continues in the one state and a read current pulse $-I_s$ such as the pulse 36 in FIG. 2A is applied to the thin metallic strip 10, a voltage wave such as that shown at 38 in FIG. 2B is induced in the sense winding 20 when the current pulse 36 is initiated, and a voltage wave such as that shown at 40 is induced in the sense winding 20 when the current pulse 36 is terminated. It is readily seen from FIGS. 2A and 2B that the output or sense signal $E_0$ from the sense winding 20 has the form of a positive excursion followed by a negative excursion resulting from the respective rise and fall of the read current pulse, regardless of whether the read sense current pulse is positive or negative. It is readily seen from FIG. 2C that whenever the remanent flux around the hole 12 is in the counterclockwise direction representing binary zero, the output signal has the form of a negative excursion followed by a positive excursion, regardless of the direction of the read current. The voltage waves 42 and 44 are produced by the initiation of the read current pulse, and the voltage waves 46 and 48 are produced by the termination of a read current pulse. Stated alternatively, the output signal is determined by the remanent state of magnetization in areas of the thin metallic strip 10 adjacent to the hole, not by the direction of the read current.

Figure 3:
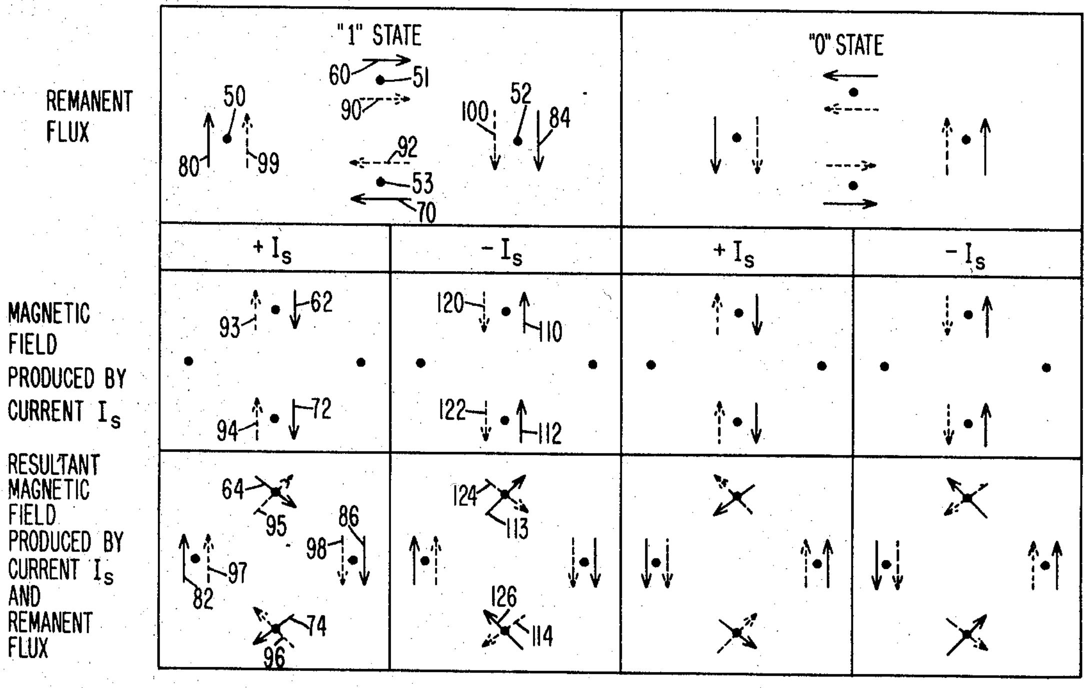
FIG. 3 shows sets of vectors useful in explaining the principles of operation of the memory element in FIG. 1.

Reference is made to FIG. 3 for an explanation of the operation of the memory device illustrated in FIG. 1. FIG. 3 illustrates the magnetic forces existing at the points 50, 51, 53, and 53 around the hole 12 in FIG. 1. The relative arrangement of the points 50 through 53 in FIG. 1 is maintained throughout FIG. 3 where the numbering of these points is omitted in the interest of simplicity with the exception of the points in the upper left hand corner. The upper portion of FIG. 3 illustrates the remanent flux around the hole 12 in FIG. 1 at the points 50 through 53. This remanent flux is established by write currents as previously explained. The arrows in the upper portion of FIG. 3 represent the direction and magnitude of the magnetic field at the points 50 through 53 for the binary one and the binary zero states as shown. The center portion of FIG. 3 illustrates the magnetic fields produced by read currents at the points 50 through 53. The arrows indicate the direction and magnitude of the magnetic fields produced by read currents $+I_s$ and $-I_s$ at points 51 and 53. The lower portion of FIG. 3 shows the resultant magnetic fields produced by the read current and the remanent flux. The arrows indicate the direction and magnitude of the resultant fields at the points 50 through 53. The solid arrows indicate the magnetic fields at the top surface of the thin metallic strip 10 at the points 50 through 53, and the dotted line arrows indicate the magnetic fields at the bottom surface of the thin metallic strip 10 at the points 50 through 53.

In order to illustrate how the chart in FIG. 3 is interpreted, let it be assumed that the remanent flux around the hole 12 in FIG. 1 is in the clockwise direction representing a binary one. For this case, the remanent flux at the points 50 through 53 in FIG. 1 is illustrated in the upper left hand portion of FIG. 3. If a read current pulse $+I_s$ is applied to the thin metallic strip 10 in FIG. 1, the magnetic field produced thereby is illustrated in the left-most part of the center section of FIG. 3 for the points 50 through 53. The resultant magnetic field produced by the read current pulse $+I_s$ and the remanent flux at the points 50 through 53 in FIG. 1 is illustrated in the lower left corner of FIG. 3. For the case at the top surface of the thin metallic strip 10 at the point 51 in FIG. 3, the vector 60, representing the remanent flux at the point 51, is combined with the vector 62, representing the magnetic field produced by the read current pulse $+I_s$, to produce the resultant vector 64 representing the resultant magnetic field produced by the remanent magnetic flux and the magnetic field produced by the current $+I_s$. Actually, the vector 60 in the upper left corner of FIG. 3 represents the magnetic field at the point 51 before the read current pulse $+I_s$ is applied, and the vector 64 in the lower left hand corner of FIG. 3 represents the resultant magnetic field during the period of the read current pulse $+I_s$. When the read current pulse $+I_s$ is terminated, the magnetic field at the point 51 changes from that indicated by the vector 64 in the lower left hand corner of FIG. 3 to that indicated by the vector 60 in the upper left hand corner of FIG. 3. Thus, it is seen how the magnetic field changes at the point 51 in FIG. 1 when a read current $+I_s$ is applied.

The change in the magnetic field at the top surface of the thin metallic strip 10 at the point 53 can readily be determined in view of the foregoing explanation. Briefly, the vector 70 in the upper left hand corner of FIG. 3, representative of the remanent flux, is combined with the vector 72 in the left-most portion of the center part of FIG. 3, representing the magnetic field at the top surface produced by the read current pulse $+I_s$, to produce a resultant vector 74 as illustrated in the lower left corner of FIG. 3. The vector 70 represents the magnetic field at the point 53 at the top surface of the thin metallic strip 10 before and after the read current pulse $+I_s$, and the vector 74 in the lower left corner of FIG. 3 represents the magnetic field at this point during the read current pulse $+I_s$. Thus, the change in the magnetic field at the point 53 at the top surface of the thin metallic strip 10 in FIG. 1 may be seen by comparing the vectors 70 and 74 in FIG. 3.

There is no change in the magnetic field at the points 50 and 52 on the top or the bottom of the thin metallic strip 10 in FIG. 1, and this is indicated by the absence of vectors adjacent these points in the center portion of FIG. 3. The reason for this is readily explained. If it is assumed that current $+I_s$ flows to the point 50 in FIG. 1, this current must divide at the point 50 and flow in either of two paths, upwardly around the hole or downwardly around the hole. Assuming that the current splits equally, it is seen that the current flowing upwardly from the point 50 is equal to the current flowing downwardly from the point 50, and the two magnetic fields produced by such currents, being in opposing directions, neutralize each other to produce a resultant of zero magnetic field at the point 50. For like reasons the magnetic field produced at the point 52 is zero. It is readily observed in FIG. 3 that the magnetic field at the points 50 and 52 remains the same before, during and after a read current pulse is applied in either direction. The vector 80 in the upper left corner of FIG. 3 is the same as the vector 82 in the lower left corner of FIG. 3, and the vector 84 is the same as the vector 86.

Although, the changes for points around the aperture 12 lying between the points 50 through 53 are not illustrated in FIG. 3, they can readily be determined by plotting the remanent magnetic field with the magnetic field produced by the read current and finding the resultant magnetic field. It is seen from inspection of FIG. 3 that the change in the resultant magnetic field on the top of the thin metallic strip 10 in FIG. 1 increases from zero at the point 50 to a maximum at the point 51, and then it decreases to zero at the point 52 in FIG. 1. In like fashion the change in the resultant magnetic field changes from zero at the point 52 in FIG. 1 to a maximum at the point 53, and it decreases thereafter to zero at the point 50 in FIG. 1. Accordingly, it is seen how the magnetic field changes around the hole 12 on top of the metallic strip 10 in FIG. 1. It should be noted that irrespective of the direction in which a resultant flux vector is tilted (e.g., clockwise in the case of vector 64, FIG. 3, or counterclockwise in the case of vector 74, FIG. 3), the effect upon the remanent flux extending circumferentially of the hole 12 is the same, i.e., the circumferential component of the flux is weakened.

Next the changes in magnetic field at the bottom of surface of the metallic strip 10 at the points 50 through 53 are considered for the case where the remanent magnetic flux is in the clockwise direction around the hole 12. The magnetic forces at the bottom surface of the thin metallic strip 10 are represented in FIG. 3 by dotted line vectors. Considering the points 51 and 53, the vectors 90 and 92 in the upper left corner of FIG. 3 represent the remanent magnetic flux of the binary one state. These vectors are combined with respect vectors 93 and 94, shown in the left-most portion of the center section of FIG. 3, which represent the magnetic field produced by a read current pulse $+I_s$. The resultant magnetic fields are represented in the lower left corner of FIG. 3 by respective vectors 95 and 96. There is no change in the remanent flux at the points 50 and 52 at the bottom surface of the metallic strip 10, and this is illustrated in the lower left corner of FIG. 3 by the vectors 97 and 98 which have the same direction and magnitude as the respective vectors 99 and 100 in the upper left corner of FIG. 3. The change in the resultant magnetic field around the aperture 12 on the bottom of the thin metallic strip 10 increases from zero at the point 50 to a maximum at the point 51, and it then decreases to zero at the point 52. In like fashion, the change in the resultant magnetic field increases from zero at the point 52 to a maximum at the point 53, and it then decreases to zero at the point 50. Accordingly, it is seen how the resultant magnetic field is changed in the areas adjacent the aperture 12 on the bottom of the magnetic strip 10 in response to a read current pulse $+I_s$.

In case a read current pulse $-I_s$ is applied to the metallic strip 10 in FIG. 1 when the remanent magnetic flux around the hole 12 is in the clockwise direction representing a binary one, the vectors 60 and 70, associated with points 51 and 53 in FIG. 3, combine with respective vectors 110 and 112 to produce respective resultant vectors 113 and 114 in FIG. 3. This illustrates the changes which take place at the top surface of the thin metallic strip 10 in FIG. 1 at the points 51 and 53. The changes in magnetic field which take place at these points at the bottom surface of the metallic strip 10 in FIG. 1 are caused by the remanent magnetic flux vectors 120 and 122 to produce respective resultant vectors 124 and 126. The changes in the resultant magnetic field around the aperture 12 increase from zero at points 50 and 52 to a maximum at respective points 51 and 53 to zero at respective points 52 and 50. Accordingly, it is seen how the resultant magnetic field changes around the aperture 12 in response to a read current pulse $-I_s$ when the remanent flux is in the clockwise direction representing a binary one. It should be noted that irrespective of whether the read current pulse $I_s$ is of positive or negative polarity, it has the same effect in weakening the circumferential component of the flux; hence the polarity of the resulting sense signal is the same in both cases.

The vectors in the right half portion of FIG. 3 show the magnetic state when the remanent flux around the aperture 12 in FIG. 1 is in a counterclockwise direction representing a binary zero, and this portion of FIG. 3 shows the changes caused by applying read current pulses of $+I_s$ and $-I_s$. The representations in the right half portion of FIG. 3 readily may be understood in view of the foregoing detailed explanation of the representations in the left half portion of FIG. 3.

In one arrangement constructed according to this invention, the thin metallic strip 10 in FIG. 1 was made of Mo-Permalloy, stock 4–79. The dimensions were such that the width of the thin metallic strip was 0.250 inch, the thickness was 0.0005 inch and the diameter of the hole was 0.150 inch. The read current $I_s$ was 1 ampere and the sense signal or output voltage $E_o$ for the first and the *n*th pulses are indicated in Table I below, where *n* is greater than 10,000.

TABLE I

| | $E_o$ 1st, mv. | $E_o$ *n*th, mv. |
|---|---|---|
| Read current pulse width: | | |
| 10 microseconds | 35 | 16 |
| 40 nanoseconds | 23 | 20 |

Figure 4:
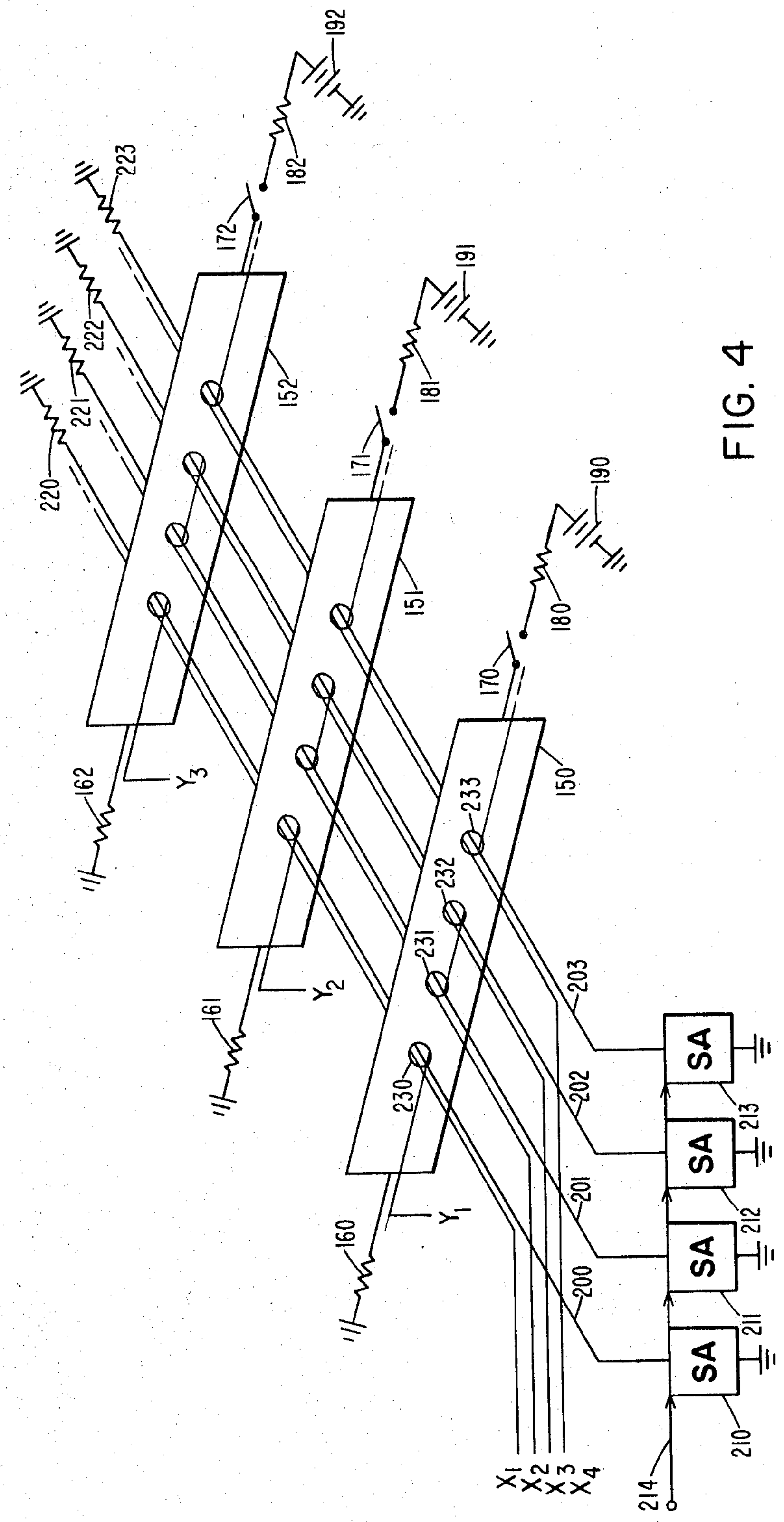
FIG. 4 shows a memory array having a plurality of memory elements of the type illustrated in FIG. 1.

Reference is made to FIG. 4 for a description of a matrix array which utilizes a plurality of memory cells of the type illustrated and described in FIG. 1. There is illustrated in FIG. 4 a memory device for storing three words having four bits in each word. Three thin metallic strips 150 through 152 are employed, and each of these thin metallic strips has four holes disposed therein as illustrated. Resistors 160 through 162 are connected to one end of the respective thin metallic strips 150 through 152, and switches 170 through 172 are connected to the opposite end of the respective thin metallic strips 150 through 152. Resistors 180 through 182 are connected to associated batteries 190 through 192, and when respective switches 170 through 172 are closed, read current is supplied to the respective thin metallic strips 150 through 152. Only one of the switches 170 through 172 is operated at any given time to perform a read-out operation. Information stored in the thin metallic strips 150 through 152 may be read out by closing an associated one of the switches 170 through 172. During a read out operation signals such as illustrated in FIG. 2B and FIG. 2C are established on the sense lines 200 through 203 in FIG. 4, depending upon the state of magnetization around the holes of the selected thin metallic strip. The sense signals on the lines 200 through 203 are applied to respective sense amplifiers 210 through 213 where the signals are detected, amplified, shaped and supplied to a utilization device, not shown. The lines 200 through 203 are connected through respective resistors 220 through 223 to ground.

Information may be written in the memory array of FIG. 4 by using individual write lines for each hole, such as that shown in FIG. 1. Alternatively, the circuitry and number of lines involved may be substantially reduced if coincident current techniques are employed in the memory array of FIG. 4. That is, write lines according to two coordinates may be utilized. A first set of write lines $X_1$, $X_2$, etc. according to one coordinate X may be threaded through the array in the same manner as the sense lines 200 through 203; whereas, a second set of write lines $Y_1$, $Y_2$, etc. according to another coordinate, Y may be provided where the number of such lines is equal to the number of the thin metallic strips employed; and each of these lines threads all holes in a given metallic strip. Writing operations may take place in a selected thin metallic strip by energizing the single line in the second set of write lines (Y) which threads all holes in that strip with a half current simultaneously as all of the lines in the first set of write lines (X) are energized with half currents in one direction or the other representative of binary information. A half current is one which is not sufficient by itself to change the state of magnetization around the hole, but two half currents are sufficient to change the state of magnetization around a hole.

In order to illustrate the operation of the nondestructive readout memory device in FIG. 4, let it be assumed that information previously has been written in each of the thin metallic strips 150 through 152. For purposes of illustration let it be assumed that the information stored in the thin metallic strip 150 is to be read out. The switch 170 is closed, and current flows from the battery 190 through the resistor 180, the thin metallic strip 150 and the resistor 160 to ground. As a result a read current $-I_s$ flows through the thin metallic strip 150, and signals are induced on the sense lines 200 through 203 of the type illustrated in FIGS. 2B and 2C, depending upon the state of magnetization of the thin metallic strip 150 around each of the holes 230 through 233. If the read current is reversed in direction, the output signals have the same polarity as shown in FIGS. 2A, 2B, and 2C for reasons earlier explained. The sense amplifiers 210 through 213 may be adapted to respond to a positive signal and provide a positive output signal representative of binary one, and these sense amplifiers may respond to a negative signal to provide a negative output signal representative of a binary zero. The sense amplifiers may be strobed or sampled by means, not shown, to sample the signals on the lines 200 through 203 as soon as the switch 170 is closed. The strobing pulse applied on line 214 to the sense amplifiers 210 through 213 preferably is terminated before the switch 170 is opened. Thus, voltage waves such as waves 32 and 38 in FIG. 2B are investigated for positive excursions; whereas, the voltage waves such as 34 and 40 in FIG. 2B are not investigated. In like fashion, the voltage waves 42 and 44 in FIG. 2C are investigated or sampled; whereas, the voltage waves 46 and 48 are not investigated or sampled. Output signals representative of binary information may be presented by the sense amplifiers 210 through 213 in FIG. 4 to a utilization device not shown. Under the assumed conditions a positive signal represents a binary one, and a negative signal represents binary zero. Alternatively, the absence of a positive signal could signify a binary zero to the utilization device. As soon as the sampling or strobing operation is completed, the switch 170 in FIG. 4 may be opened, and information stored in the thin metallic strip 150 may be interrogated again by closing the switch 170. Alternatively, information stored in the metallic strip 151 or 152 may be interrogated by closing respective switches 171 or 172. Any of the switches 170 through 172 may be operated at any given period of time to selectively read data stored in an associated one of the metallic strips 150 through 152. Accordingly, it is seen how a storage element of the type illustrated in FIG. 1 may be employed in a memory array such as shown in FIG. 4.

Figure 5:
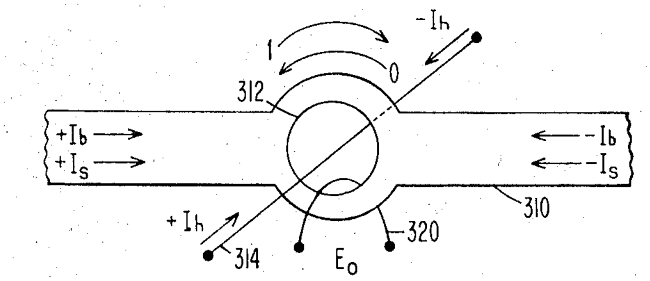
FIG. 5 shows another memory element according to this invention.

Reference is made to FIG. 5 for a discussion of a further arrangement of a memory element. A thin metallic strip 310 is shown with an aperture 312 therein. The thin metallic strip 310 is made from a material which is magnetizable, and it is important that this strip have a thickness which is small compared to the width or length. Alternatively stated, the width and length are large compared to the thickness.

A write line 314 passes through the hole or aperture 312, and currents along this line are employed to establish remaining states of magnetization in the areas adjacent the aperture 312. Current flowing to the right or upwardly along the line 314 is arbitrarily designated $+I_h$. This establishes a magnetic field in a clockwise direction around the hole 312, and a magnetic field in this direction is arbitrarily assumed to represent a binary one. Current to the left or downwardly along the line 314 is designated $-I_h$. Current in this direction along the line 314 establishes a magnetic field in a counterclockwise direction around the hole 312, and such a magnetic field is arbitrarily assumed to represent binary zero. After current is terminated on the line 314, a remanent state of magnetization is establishes in the areas of the strip 310 adjacent the aperture 312 in a clockwise or counterclockwise direction, depending upon the direction of current previously established in the line 314.

A sense winding 320 is threaded through the hole 312 as shown, and a sense signal is induced in this winding when current pulses are established in the thin metallic strip 10 in either direction. A read current $+I_s$ is designated as a current from left to right in the thin metallic strip 310, and a read current $-I_s$ is designated as a current from the right to the left in the thin metallic strip 310. In addition to the read current applied to the thin metallic strip 310, a bias current is applied. A bias current $+I_b$ is designated as a current from left to right in the thin metallic strip 310, and a bias current $-I_b$ is designated as a current from right to left in the thin metallic strip 310. The bias current preferably is constantly applied while the rear current is a pulse which is applied each time a reading operation takes place.

Figure 6:
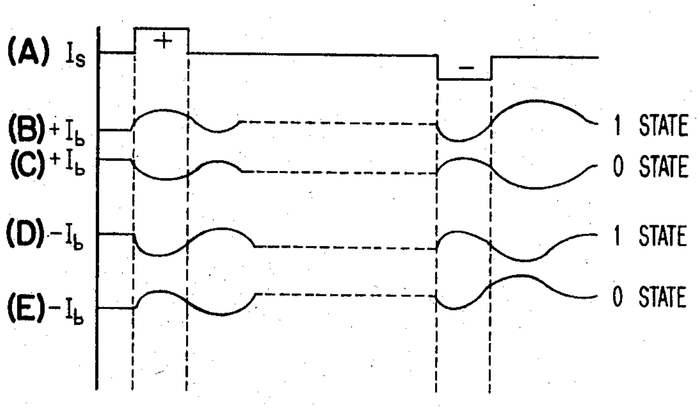
FIG. 6 illustrates a set of waveforms useful in explaining the operation of the memory element in FIG. 5.

Reference is made to FIG. 6 which illustrates the output or sense signals from the winding 320 in FIG. 5 in response to various combinations of (1) the states of magnetization of the areas adjacent the aperture 312, (2) the read currents in both directions and (3) the bias currents in both directions. Referring more specifically to the left half of FIG. 6, the changes associated with a read current pulse of $+I_s$ are described. If a read current pulse $+I_s$ such as shown in FIG. 6A is applied to the thin metallic strip 310 in FIG. 5, the output wave $E_o$ from the winding 320 in FIG. 5 is a positive excursion followed by a negative excursion as illustrated in FIG. 6B whenever the remanent state of magnetization is the one state and the bias current is $+I_b$. The output wave form is likewise a positive excursion followed by negative excursion as shown in FIG. 6E whenever the remanent state of magnetization is the zero state, the bias current is $-I_b$ and the read current pulse is $+I_s$. On the other hand, the output waveform from the winding 320 is a negative excursion followed by a positive excursion as shown in FIGS. 6C and 6D whenever a read current pulse of $+I_s$ is applied and (1) the remanent state of magnetization is the zero state with a bias current of $+I_b$ or (2) the remanent state of magnetization is the one state with a bias current of $-I_b$.

The interpretation of the waveforms in the right half of FIG. 6 is readily apparent in view of the foregoing discussion of the wave forms illustrated in the left half of FIG. 6. It is pointed out that the wave forms in the right half of FIG. 6 are the reverse of the wave forms shown in the left half of FIG. 6.

A detailed discussion similar to that given on the memory element of FIG. 1 explaining the changes in the magnetic field at selected points 50 through 53 is not given with respect to the storage element illustrated in FIG. 5 because the analysis is similar. The difference results from the bias current, and such changes can be readily determined in view of the foregoing discussion of FIG. 3. The memory element of FIG. 5 may be used in a memory array of the type shown in FIG. 4.

While the invention has been particularly shown and described with reference to preferred embodiments thereof, it will be understood by those skilled in the art that various changes in form and details may be made therein without departing from the spirit and scope of the invention.

What is claimed is:

1. A magnetic data storage device, comprising:

a unitary conductive and magnetizable strip having at least one aperture therein, the portion of said strip around each said aperture being magnetizable to store a datum representation therein;

writing means selectively operable to establish in the portion of said strip around any said aperture a distinctive remanent magnetization extending in a selected peripheral direction around the respective aperture, thereby causing each said portion of said strip to store a distinct datum representation;

reading means for applying to said portion of said strip a variable magnetic field a substantial part of which is in nonparallel relationship with the remanent magnetization extending around said aperture for thereby disturbing such magnetization at least momentarily;

and sensing means coupled to said portion of said strip for furnishing a signal in response to such disturbance of the remanent magnetization, thereby to indicate whether said portion was magnetized in a particular direction around said aperture prior to the application of said variable magnetic field thereto.

2. A magnetic data storage device as set forth in claim 1 wherein said writing means is arranged to establish in the magnetizable portion of said strip adjacent to said aperture a remanent magnetization which is uniformly directed peripherally of said aperture in a selected one of two opposite directions, whereby the signal furnished by said sensing means in response to such disturbance of the remanent magnetization has either one polarity or the opposite polarity according to the datum stored in said portion.

3. A magnetic data storage device as set forth in claim 1 wherein said reading means includes a part having continuity with said magnetizable portion of said strip for conducting read current pulses along a path at least some of which extends approximately parallel with the periphery of said aperture, thereby to induce in said portion a variable magnetic field of which a substantial part is in nonparallel relationship with respect to the periphery of said aperture.

4. A magnetic data storage device as set forth in claim 3 wherein said part for conducting read current pulses constitutes said strip.

5. A magnetic data storage device as set forth in claim 3 wherein said part for conducting read current pulses includes two complementary sections which together enclose said aperture, said sections being so arranged that a part of each read current pulse passes through one of said sections in a clockwise sense relative to said aperture while another part of such read current pulse passes through the other of said sections in a counterclockwise sense relative to said aperture.

6. A magnetic data storage device as set forth in claim 3 which includes biasing means for causing a steady unidirectional bias current to be conducted along said path.

7. A magnetic data storage device as set forth in claim 3 having a series of said apertures longitudinally spaced along said strip to define a plurality of bit storage portions each corresponding to a respective one of the various bit positions in a word, said writing means being coupled with each of said bit storage positions and operable to establish remanent magnetizations extending in selected directions around at least selected ones of said apertures, and said sensing means including a plurality of sense conductors each coupled to a respective one of said bit storage portions.

8. Magnetic data storage apparatus including a plurality of data storage devices each of the type set forth in claim 7, each of said strips being adapted to store the bits of a respective word, said writing means being operable to store bit representations in any selected one of said word strips, said treading means being adapted to supply read current to any selected one of said devices, and each of said sense conductors being coupled to corresponding bit storage portions of all said strips.

9. A binary data storage cell comprising a film of ferromagnetic material having in it an aperture, the material adjacent to and surrounding said aperture being magnetized in one direction or the other around the aperture to store a binary digit, a sense conductor threading said aperture, and means for applying a current pulse along an axis lying in the plane of, and intersecting, the aperture to produce a signal in said sense conductor indicating the direction of magnetization around said aperture immediately prior to application of the pulse.

References Cited

UNITED STATES PATENTS

| | | | |
|---|---|---|---|
| 2,874,374 | 2/1959 | Lane | 340—174 |
| 3,023,400 | 2/1962 | Booth | 340—174 |
| 3,078,445 | 2/1963 | Sass | 307—88.5 |
| 3,192,512 | 6/1965 | Korkowski | 340—174 |
| 3,212,068 | 10/1965 | Vinal | 340—174 |

STANLEY M. URYNOWICZ, JR., Primary Examiner